United States Patent
Wang et al.

(10) Patent No.: US 10,917,646 B2
(45) Date of Patent: Feb. 9, 2021

(54) INTRA CODE-RATE PREDICTING WITH RATE DISTORTION OPTIMIZATION METHOD IN VIDEO CODING

(71) Applicant: PEKING UNIVERSITY SHENZHEN GRADUATE SCHOOL, Shenzhen (CN)

(72) Inventors: Ronggang Wang, Shenzhen (CN); Hongbin Cao, Shenzhen (CN); Zhenyu Wang, Shenzhen (CN); Wen Gao, Shenzhen (CN)

(73) Assignee: PEKING UNIVERSITY SHENZHEN GRADUATE SCHOOL, Shenzhen (CN)

( * ) Notice: Subject to any disclaimer, the term of this patent is extended or adjusted under 35 U.S.C. 154(b) by 0 days.

(21) Appl. No.: 16/334,931

(22) PCT Filed: Jul. 24, 2017

(86) PCT No.: PCT/CN2017/094015
§ 371 (c)(1),
(2) Date: Mar. 20, 2019

(87) PCT Pub. No.: WO2018/076827
PCT Pub. Date: May 3, 2018

(65) Prior Publication Data
US 2019/0289298 A1   Sep. 19, 2019

(30) Foreign Application Priority Data
Oct. 26, 2016   (CN) .......................... 2016 1 0948219

(51) Int. Cl.
  *H04N 7/12*         (2006.01)
  *H04N 19/159*     (2014.01)
(Continued)

(52) U.S. Cl.
  CPC .......... *H04N 19/159* (2014.11); *H04N 19/11* (2014.11); *H04N 19/124* (2014.11);
(Continued)

(58) Field of Classification Search
  CPC .... H04N 19/159; H04N 19/11; H04N 19/124; H04N 19/147; H04N 19/176;
(Continued)

(56) References Cited

U.S. PATENT DOCUMENTS

| | | |
|---|---|---|
| 2011/0080942 A1 | 4/2011 | Nagara et al. |
| 2014/0146884 A1 | 5/2014 | Cho et al. |
| 2016/0261870 A1* | 9/2016 | Tu ........................ H04N 19/176 |

FOREIGN PATENT DOCUMENTS

| | | |
|---|---|---|
| CN | 101141649 A | 3/2008 |
| CN | 101466040 A | 6/2009 |

(Continued)

OTHER PUBLICATIONS

Xin Zhao et al., "Novel Statistical Modeling, Analysis and Implementation of Rate-Distortion Estimation for H.264/AVC Coders", IEEE Transactions on Circuits and Systems for Video Technology, vol. 20, No. 5, May 2010, pp. 647-660.

*Primary Examiner* — Richard T Torrente
(74) *Attorney, Agent, or Firm* — Miles & Stockbridge P.C.

(57) ABSTRACT

An intra code-rate predicting method in video coding, which enables skipping of an entropy coding procedure during a rate-distribution optimization process and effectively reduces the coding time by modeling residual information of a prediction block and predicting the number of coding bits based on a model resulting from the modeling.

4 Claims, 3 Drawing Sheets

(51) Int. Cl.
  *H04N 19/124* (2014.01)
  *H04N 19/147* (2014.01)
  *H04N 19/176* (2014.01)
  *H04N 19/91* (2014.01)
  *H04N 19/11* (2014.01)

(52) U.S. Cl.
  CPC ......... *H04N 19/147* (2014.11); *H04N 19/176* (2014.11); *H04N 19/91* (2014.11)

(58) Field of Classification Search
  CPC .... H04N 19/91; H04N 19/149; H04N 19/119; H04N 19/126; H04N 19/14
  See application file for complete search history.

(56) References Cited

FOREIGN PATENT DOCUMENTS

| | | |
|---|---|---|
| CN | 102695055 A | 9/2012 |
| CN | 103024383 A | 4/2013 |
| CN | 103546749 A | 1/2014 |
| CN | 106454360 A | 2/2017 |

\* cited by examiner

INTRA CODE-RATE PREDICTING WITH RATE DISTORTION OPTIMIZATION METHOD IN VIDEO CODING

CROSS-REFERENCE TO RELATED APPLICATIONS

The present application is a national stage filing under 35 U.S.C. § 371 of PCT/CN2017/094015, filed on Jul. 24, 2017 which claims priority to CN Application No. 201610948219.3 filed on Oct. 26, 2016. The applications are incorporated herein by reference in their entirety.

FIELD

The present disclosure generally relates to the field of video coding, specifically relates to an intra (IFrame) prediction and coding technology, and more particularly relates to an intra (IFrame) code-rate predicting method in video coding, which may quickly and efficiently select a best mode for intra prediction and thus reduce the time needed for intra coding.

BACKGROUND

Video coding is a technology of video compression. Video data in daily life include two parts: information and redundant data. Video coding aims to remove the redundant part of the video data to alleviate the burden of storing and transmitting video data. Current mainstream video coding platforms adopt a block-based combined coding framework, where a block needs to go through the procedures of predicting, transforming, quantizing, and entropy coding so as to eliminate statistical redundancies in the video data as much as possible.

RDO (Rate-Distortion Optimization) is a scheme of reducing the number of coding bits as much as possible while guaranteeing a certain video quality or a scheme of reducing coding distortion as much as possible under restriction of a certain code rate. During a rate distortion process, merits of each prediction approach is evaluated using a rate-distortion function, mainly by means of evaluating the distortion and the number of coding bits of each prediction mode. Under a same distortion, a prediction mode with a smaller number of coding bits is selected during the RDO process. Therefore, the distortion and the number of coding bits of each prediction mode need to be obtained during the RDO process. However, to obtain the number of coding bits of a certain prediction mode, entropy coding needs to be performed to a result of quantizing a transform of the prediction block, which is a rather time-consuming process.

SUMMARY

To overcome the drawbacks in the existing technologies, the present disclosure provides an intra code-rate predicting method in video coding, which skips an entropy coding procedure mainly by means of modeling information of a prediction block and predicting the number of coding bits of the prediction block using an information entropy theory under the corresponding model; the method according to the present disclosure may quickly and efficiently select a best mode for intra prediction, thereby reducing the time needed for intra coding. In this way, with less video quality loss (about 0.64% BD-rate), more time for coding is saved (37.7% RDO module time).

During an RDO process, an optimal prediction mode under each kind of block partitioning is first selected; and then a best block partitioning mode is selected out of the optimal modes of various kinds of block partitioning. A key innovative point of the present disclosure lies in that: the present disclosure adopts a novel model that combines generalized Gaussian distribution and uniform distribution; based on the novel model, fitting of residual distributions in the video coding is closer to an actual result; besides, because a tail of the model is represented by uniform form, a computing complexity of the procedure of updating a lookup table may be greatly reduced during the entire code rate prediction process. The method according to the present disclosure adds a procedure of correcting the predicted number of coding bits, which is equivalent to correcting a decision result of the combined model, such that the corrected result is closer to an actual entropy coding result.

A technical solution of the present disclosure is provided below:

A intra code-rate predicting method in video coding, which may skip an entropy coding procedure during an RDO (Rate-Distribution Optimization) process and effectively reduce the time for coding by means of modeling residual information of a prediction block and predicting the number of coding bits of the prediction block based on an information entropy theory under the corresponding model; the code-rate predicting method mainly comprises: a procedure of making statistics on prediction block distribution information and modeling, a procedure of predicting the number of coding bits in a prediction mode based on the model, and a procedure of correcting the predicted number of coding bits; specific steps of the method are provided below:

1) the procedure of making statistics on prediction block distribution information and modeling comprises:

11) making statistics, in a unit of one frame, on distribution of residuals at each position in different prediction block sizes (during the RDO procedure, the prediction block is partitioned into different sizes, from 4×4 to 64×64), and fitting the residuals at each position in the prediction block using a combined model that combines generalized Gaussian distribution and uniform distribution model, wherein a resulting probability density function is used as a combined model of a probability distribution at the each position in the prediction block. (Note: an updating frequency of the combined model is once per frame in principle, i.e., the statistical result of the current frame is used in prediction of a next frame. However, if a certain number of samples is not reached at the end of one frame, the model will not be updated; instead, the statistical sample is updated together with the sample of the next frame).

12) computing, with the model obtained in step 11), a probability of the prediction block at the each position with a quantization result to be a specific value (i.e., supposing a quantization value obtained after quantization of a certain position on a certain prediction block is x, solving the probability of occurrence for such an occasion), and then solving an information entropy based on the probability. The resulting information entropy is used as the predicted number of coding bits of the prediction block at this position with this quantization value. The predicted number of coding bits is saved in a data table, such that the corresponding number of coding bits may be obtained only by looking up the data table during the ROD process for coding the next frame.

2) predicting the number of coding bits of each prediction mode in the RDO process based on the model:

The predicted number of coding bits of the prediction block at each position with each quantization value has been obtained during the modeling process; after the procedures of predicting, transforming, and quantizing, the predicted number of bits is obtained by looking up the corresponding data table based on the quantization result at each position, and the predicted number of coding bits of the prediction block may be obtained by summing up the numbers of coding bits at all positions of the prediction block; in this way, the procedure of entropy coding is skipped.

3) correcting the predicted number of coding bits:

With the result of step 2), an optimal prediction mode in each kind of block size (4×4≠64×64) is selected while skipping the procedure of entropy coding (this has been implemented during the RDO process; in the present disclosure, step 2) is used to replace the entropy coding procedure that has a relatively high computational complexity during the RDO process). Immediately next to the ROD process, a best mode is singled out as the final partitioning result from among the optimal modes in different block partitioning. In the present disclosure, after the optimal mode for each block size is obtained, a simple entropy coding is performed for these optimal modes, and the simple entropy coding result is used as the predicted number of coding bits in the optimal mode, to be used for singling out a best partitioning mode between different block sizes.

Compared with the prior art, the present disclosure has the following beneficial effects:

The present disclosure provides a intra code-rate predicting method in video coding, which skips an entropy coding procedure mainly by means of modeling information of a prediction block and predicting the number of coding bits of the prediction block using an information entropy theory under a corresponding model; the method according to the present disclosure may quickly and efficiently select a best mode for intra prediction, thereby reducing the time needed for intra coding. The present disclosure has the following advantages:

(1) a combined model that combines generalized Gaussian distribution and uniform distribution is more in conformity with the actual residual distribution, such that an optimal prediction mode may be identified in the same kind of block size.

(2) an entropy coding (a simple entropy coding) is re-done for the optimal mode in each kind of block size; compared with the actual entropy coding, this procedure has a lower complexity, but suffices to be used for deciding a best block partitioning approach, with less video quality loss (0.64% BD-rate loss).

(3) the statistical model is updated once per frame, while in the RDO process, it is only needed to perform a simple lookup operation, such that the time complexity is relatively low (saving 37.7% RDO module time).

where the dotted-line curve represents a traditional generalized Gaussian distribution model; the solid-line curve represents a combined model that combines the generalized Gaussian distribution and the uniform distribution; and intersected points between two vertical lines and the transverse axis represent boundary points between the generalized Gaussian distribution and the uniform distribution in the combined model.

Figure 3:
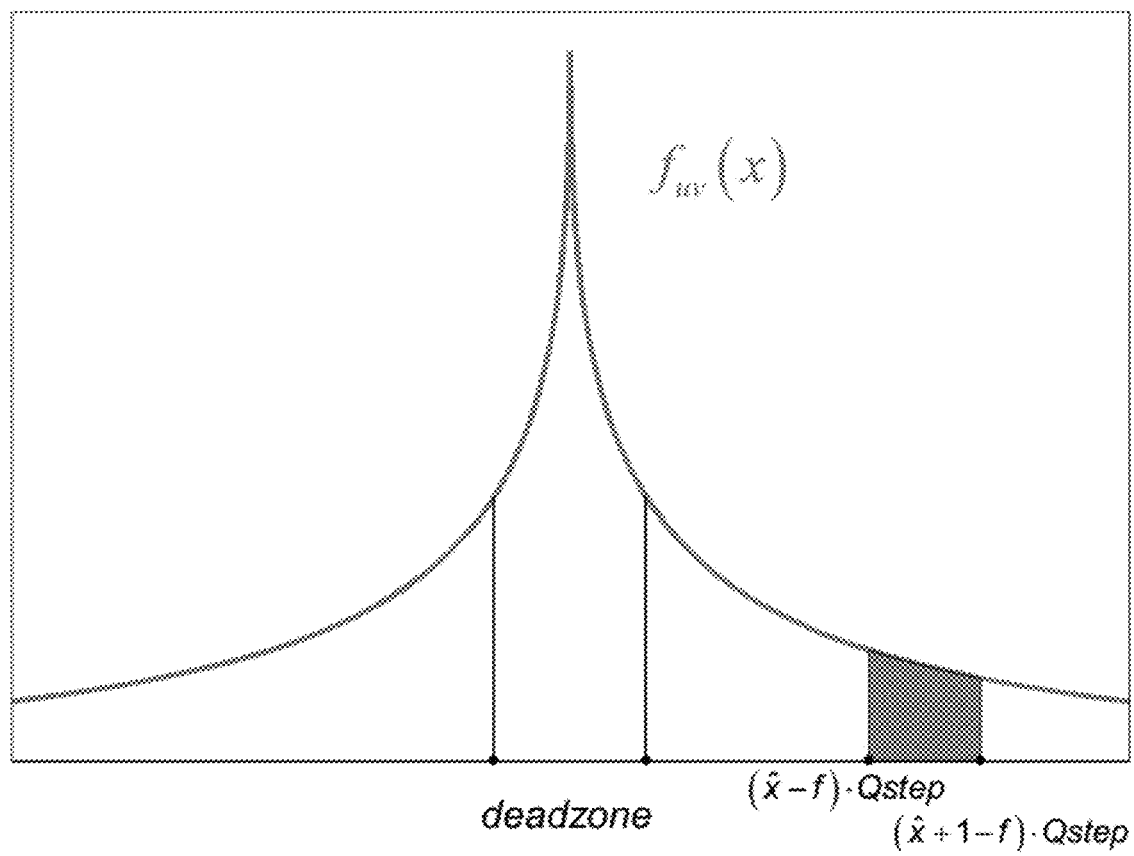

FIG. 3 shows a schematic diagram of computing a probability of quantizing a certain position in a prediction block to a specific value in the present disclosure;

in the figure, the curve represents a residual distribution at a certain position in the prediction block; the transverse axis represents a value of the position before quantization, and the longitudinal axis represents a probability density of assuming a specific value for the position before quantization; for this position, in the case of the quantized result $\hat{x}$ ($\hat{x} \neq 0$), the quantization equation $$\left( \hat{x} = \text{int}\left( \frac{|x| + f \cdot Q_{step}}{Q_{step}} \right) \cdot \text{sgn}(x), \right.$$

where f denotes quantization offset, $Q_{step}$ denotes quantization step size, int(x) denotes a rounding function, and sgn(x) denotes a symbol function) shows that the corresponding value before quantization may be located in an interval $((|\hat{x}|-f) \cdot Q_{step}, (|\hat{x}|+1-f) \cdot Q_{step})$, such that by evaluating the integral of the curve in this interval, a probability of quantizing the position to $\hat{x}$ ($\hat{x} \neq 0$) may be obtained, the area of the black shadow part in FIG. 3; for the quantized result $\hat{x}$ ($\hat{x}=0$), it may be obtained that the interval before quantization may be located $(-(1-f) \cdot Q_{step}, (1-f) \cdot Q_{step})$, which interval is referred to as a quantization deadzone; the area of the white shadow part in the middle portion of FIG. 3 represents a probability of quantizing the position to $\hat{x}$ ($\hat{x}=0$).

DETAILED DESCRIPTION OF EMBODIMENTS

Hereinafter, the present disclosure is further described through the embodiments, but the scope of the present disclosure is not limited in any manner.

The present disclosure provides a quick code-rate prediction method for an RDO (Rate Distribution Optimization) module in IFrame coding in the field of video coding, for predicting the code rate of coding in each prediction mode during the RDO process so as to replace the huge time complexity during an actual entropy coding procedure, which saves much coding time (37.7% RDO module time) with less video quality loss (0.64% BD-rate loss), The present disclosure is applicable to code-rate prediction for IFrame in video coding.

Figure 1:
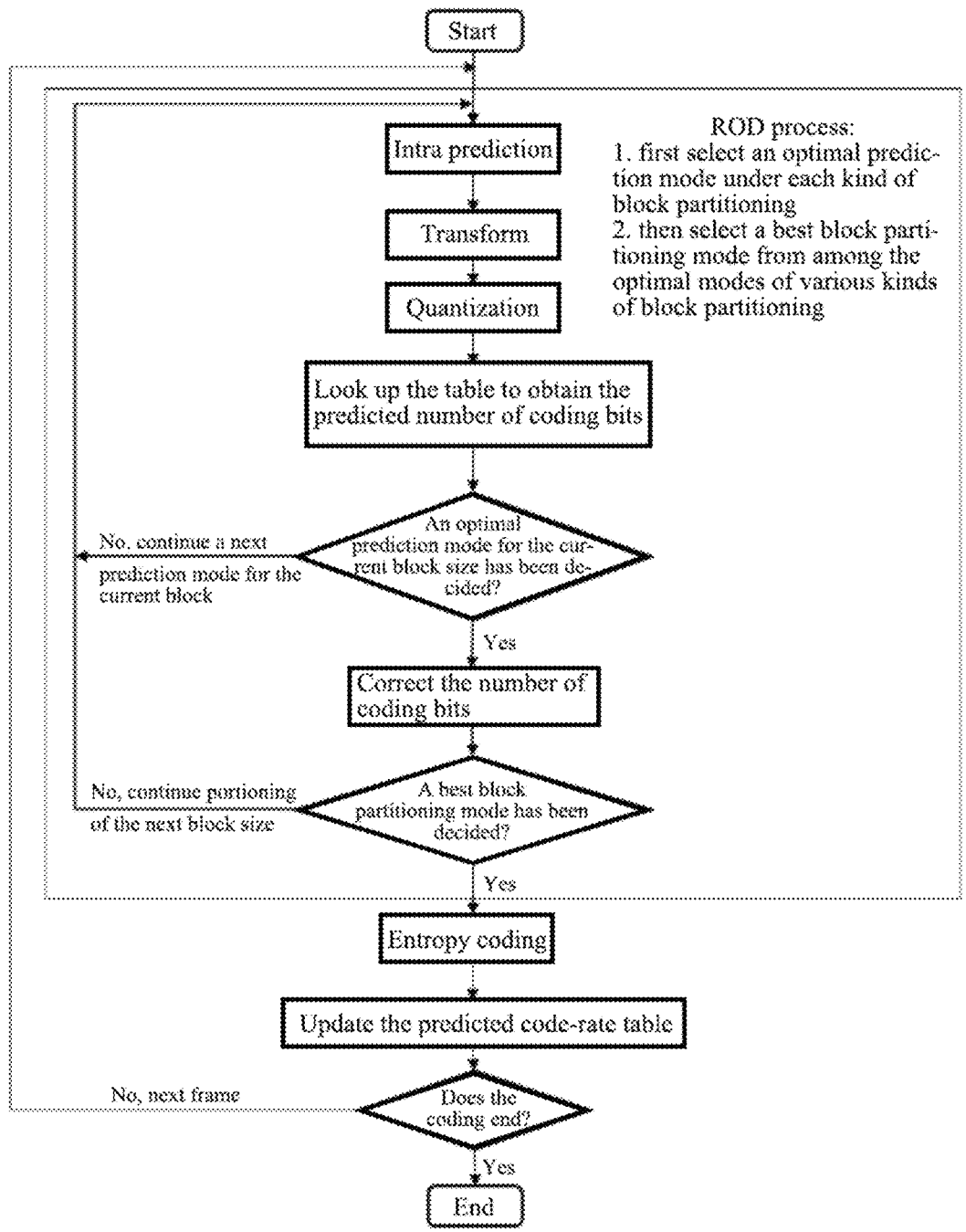
FIG. 1 is a flow block diagram of a code-rate predicting method provided according to the present disclosure.

The present disclosure may skip an entropy coding procedure during an RDO process and effectively reduce the coding time by means of modeling residual information of a prediction block and predicting the number of coding bits of the prediction block based on an information entropy theory tinder a corresponding model; FIG. 1 shows a flow block diagram of a code-rate predicting method provided according to the present disclosure, mainly comprising: making statistics on prediction block distribution information and modeling, predicting the number of coding bits of a prediction mode based on the model, and correcting the predicted number of coding bits; specific steps of the method are provided below:

1) the procedure of making statistics on prediction block distribution information and modeling comprises:

11) making statistics, in a unit of one frame, on distribution of residuals at each position in different prediction block sizes (from 4×4 to 64×64), and fitting the residuals at each position in the prediction block using a combined model that combines generalized Gaussian distribution and uniform distribution model, thereby obtaining a probability distribution at each position in the prediction block, wherein: an updating frequency of the model is once per frame in principle, i.e., the statistical result of the current frame is used in prediction of a next frame. However, if a certain number of samples is not reached at the end of one frame, the model will not be updated; instead, the statistical sample is updated together with the sample of the next frame.

12) computing a probability of a quantization result of the prediction block at each position to be a specific value, and then solving an information entropy using an information entropy equation (f(P)=−log(P)). The resulting information entropy is used as the predicted number of coding bits of the prediction block at this position with this quantization value. The predicted number of coding bits is saved in a data table, such that the corresponding number of coding bits may be obtained only by looking up the data table during the ROD process for coding the next frame.

2) predicting the number of coding bits of the prediction mode based on the model:

The predicted number of coding bits of the prediction block at each position with each quantization value has been obtained during the modeling process; after the procedures of predicting, transforming, and quantizing, the predicted number of bits is obtained by looking up the corresponding data table based on the quantization result at each position, and the predicted number of coding bits of the prediction block may be obtained by summing up the results; in this way, the procedure of entropy coding is skipped.

3) correcting the predicted number of coding bits:

An optimal prediction mode of the current block size is decided according to the approach above in each block size (4×4 64×64). After the optimal modes for all block sizes are obtained, a simple entropy coding will be performed for these optimal modes, and a result of the simple entropy coding is used as the predicted number of coding bits for the best mode, to be used for singling out a best partitioning mode between different block sizes.

During the procedure of making statistics on distribution information of the prediction block and modeling, specifically: statistics is made, in a unit of one frame, on the residual distribution at each position in different prediction block sizes, wherein each position has an independent residual distribution model, and the residuals at the each position in the prediction block are fitted using a combined model that combines generalized Gaussian distribution and uniform distribution model, thereby obtaining a probability distribution at the each position in the prediction block. A function expression of the generated Gaussian distribution is provided below:

$$f_{uv}(x) = \frac{\eta_{uv}\alpha_{uv}(\eta_{uv})}{2\sigma_{uv}\Gamma(1/\eta_{uv})}\exp\left\{-\left[\alpha_{uv}(\eta_{uv})\frac{|x|}{\sigma_{uv}}\right]^{\eta_{uv}}\right\} \quad \text{(equation 1)}$$

wherein $$\alpha_{uv}(\eta_{uv}) = \sqrt{\frac{\Gamma(3/\eta_{uv})}{\Gamma(1/\eta_{uv})}} \quad \text{(equation 2)}$$

Figure 2:
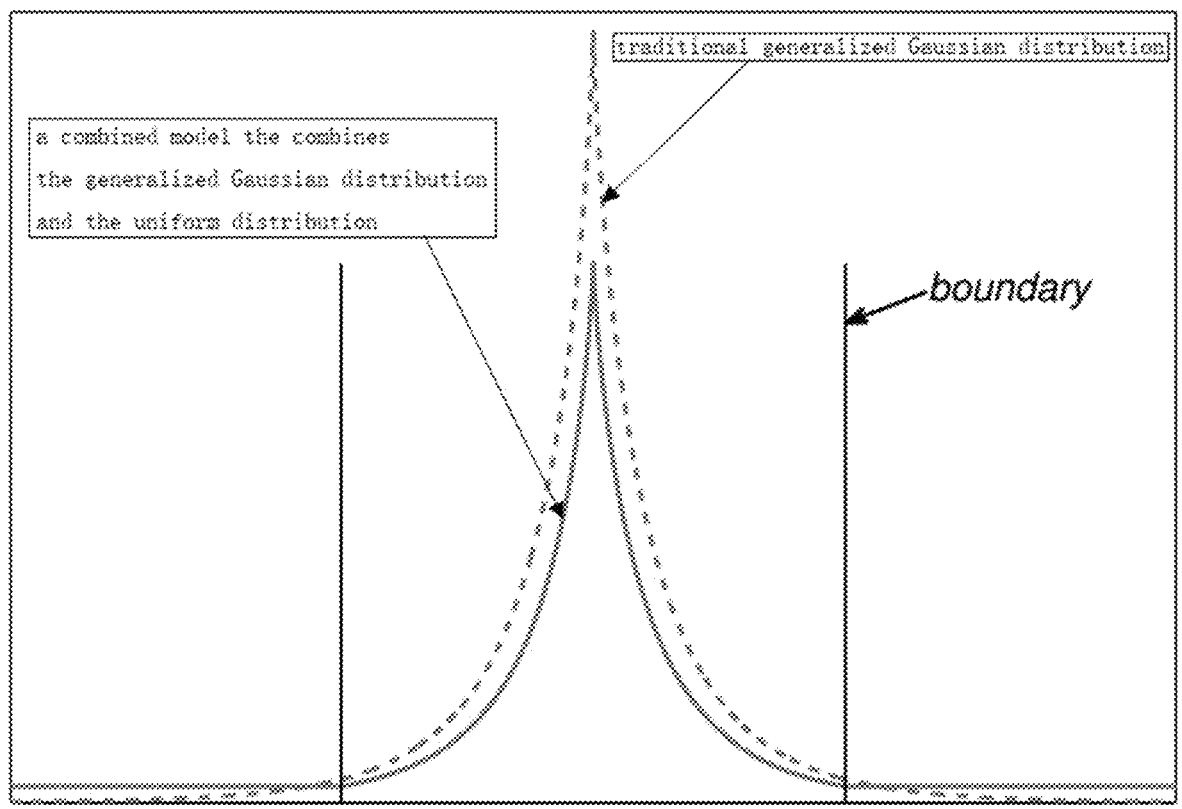
FIG. 2 shows a probability density function diagram of the existing generalized Gaussian distribution model and the combined model provided by the present disclosure.

In the expression, $f_{uv}(x)$ represents a probability density distribution (where u and v are coordinates of a position in the prediction block) of each position in the prediction block, $\sigma_{uv}$ denotes a standard deviation at the position, $\eta_{uv}$ controls a shape of the probability density function (predicted using the expression $$\eta_{uv} = 0.2718 \Big/ \left(0.7697 - \frac{E^2\{|x|\}}{E\{x^2\}}\right) - 0.1247),$$

and Γ(•) represents a gamma function. In the present disclosure, the generalized Gaussian distribution model and the uniform distribution model are combined into a combined model, whose $f_{uv}'(x)$ is shown in equation 3:

$$f_{uv}'(x) = \begin{cases} \theta_{uv} \cdot f_{uv}(x) & |x| \le b_{uv} \\ f_{uv}'(b_{uv})b_{uv} < |x| \le m_{uv} \\ 0 & |x| \ge m_{uv} \end{cases} \quad \text{(equation 3)}$$

where $\theta_{uv}$ is an adjustment factor to guarantee that the integral of the probability density function is 1 in the entire interval; $b_{uv}$ represents a boundary between the generalized Gaussian distribution and the uniform distribution; $m_{uv}$ represents an available maximum value of x after quantization, thereby obtaining an expression of the combined model that combines the generalized Gaussian distribution and the uniform distribution; as shown in FIG. 2. FIG. 2 shows a probability density function diagram of the existing generalized Gaussian distribution model and the combined model provided by the present disclosure.

During the procedure of predicting the number of coding bits of the prediction mode based on the model, specifically, a probability (P{$\widehat{C_{uv}}$=$\hat{x}$}) of the quantization result to be a certain specific value $\hat{x}$ is first computed based on the probability density function of the combined model. FIG. 3 shows a schematic diagram of computing a probability of quantizing a certain position in a prediction block to a specific value in the present disclosure. As shown in FIG. 3, a computation expression for the generalized Gaussian distribution in the model is represented in equation 4:

$$P\{\widehat{C_{uv}} = \hat{x}\} = \begin{cases} 2 \cdot \int_0^{(1-f)\cdot Q_{step}} f_{uv}'(x)dx & \hat{x} = 0 \\ \int_{(|\hat{x}|-f)\cdot Q_{step}}^{(|\hat{x}|+1-f)\cdot Q_{step}} f_{uv}'(x)dx & \hat{x} \ne 0 \end{cases} = \quad \text{(equation 4)}$$

$$\begin{cases} 2(1-f)\cdot Q_{step} \cdot f_{uv}'(x^*)\hat{x} = 0 \\ Q_{step} \cdot f_{uv}'(x^*)\hat{x} \ne 0 \end{cases}$$

where f represents quantization offset, and $Q_{step}$ represents quantization step size. In the case of $\hat{x}\ne 0$, $x^*=|\hat{x}|\cdot Q_{step}$ is taken as an approximate result of the computation, while in the case of $\hat{x}=0$, it is unnecessary to compute the probability; as mentioned below, the number of coding bits in the case of the quantization result being 0 is neglected.

A computation expression for the uniform distribution in the model is represented in equation 5:

$$P\{\widehat{C_{uv}}=\hat{x}\}=Q_{step}f_{uv}'(b_{uv}) \quad \text{(equation 5)}$$

After obtaining the probability, the number of coding bits may be predicted through the equation 6 using an information entropy theory.

$$r_{uv} = \begin{cases} 0 & \hat{x} = 0 \\ -\log_2\{\widetilde{C_{uv}} = \hat{x}\} & \hat{x} \neq 0 \end{cases} \quad \text{(equation 6)}$$

In this way, the number of coding bits for each prediction block may be obtained through equation 7:

$$r_B = \Sigma_u \Sigma_v r_{uv} \quad \text{(equation 7)}$$

It needs to be noted that the equation for probability computation has a relatively high computation complexity. The computation result may be saved in a lookup table such that it is only needed to compute once when updating the probability model and then cache the result; in this way, the result may be directly searched in the subsequent RDO module, thereby effectively enhancing the time efficiency of the RDO module.

The scheme above may quickly predict an optimal prediction mode in the same block size; however, this predicted number of coding bits does not have a desired effect in deciding with respect to different block sizes, such that it is needed to correct the predicted code rate.

During the procedure of correcting the predicted code rate, specifically, after an optimal mode for one block size is obtained, this mode may be subjected to a simple entropy coding once, and the result is used as the basis for RDO decision between different block sizes. The principle of the simple entropy coding is relatively simple. It is only needed to binarize the complete entropy coding procedure and then use the binarized number of bits as the final predicted number of coding bits.

Now, all steps of predicting the code rate during the RDO process are completed.

It needs to be noted that the embodiments as disclosed are intended to facilitating further understanding of the present disclosure; however, those skilled in the art may understand that various substitutions and modifications are possible without departing from the spirit and scope of the present disclosure. Therefore, the present disclosure should not be limited to the contents disclosed in the embodiments, but should be governed by the appended claims.

We claim:

1. An intra code-rate predicting method in video coding, which enables skipping of an entropy coding procedure during a rate-distribution optimization process and effectively reduces a coding time by modeling residual information of a prediction block and predicting a number of coding bits based on a model resulting from the modeling; the intra code-rate predicting method comprises: a procedure of making statistics on prediction block distribution information and modeling, a procedure of predicting the number of coding bits of each prediction mode during a rate distortion optimization process based on the model, and a procedure of correcting predicted number of coding bits; wherein 1) the procedure of making statistics on prediction block distribution information and modeling comprises:
11) partitioning the prediction block into different sizes, making statistics, in a unit of one frame, on distribution of residuals at each position in different sizes, and fitting the residuals at each position in the prediction block using a combined model that combines generalized Gaussian distribution and uniform distribution model, wherein a resulting probability distribution function is used as a combined model of a probability distribution at each position in the prediction block;
12) computing a quantization value at each position of the prediction block and a probability of the quantization value to be a specific value; then solving an information entropy based on the probability, where the information entropy is used as the predicted number of coding bits corresponding to the quantization value of a corresponding position of the prediction block; and saving the predicted number of coding bits in a data table;

2) the procedure of predicting the number of coding bits of each prediction mode during the rate distortion optimization process based on the model comprises: during the rate distortion optimization process, after the procedures of predicting, transforming, and quantizing, obtaining the predicted number of coding bits for the position by looking up the data table from step 12) based on the quantization result at each position, and obtaining the predicted number of coding bits of the prediction block by summing up numbers of predicted coding bits at all positions of the prediction block, thereby skipping the entropy coding procedure; and 3) the procedure of correcting the predicted number of coding bits comprises: performing a simple entropy coding for an optimal prediction mode for a current prediction block, and using a result of the simple entropy coding result as the predicted number of coding bits for an optimal mode, for singling out a best partitioning mode between different block sizes;

thereby completing the intra code-rate prediction during the rate distortion optimization process;

the code-rate predicting method, wherein in the step 11), the generalized Gaussian distribution model and the uniform distribution model are combined into a combined model, the combined model being expressed as:

$$f'_{uv}(x) = \begin{cases} \theta_{uv} \cdot f_{uv}(x) & |x| \leq b_{uv} \\ f'_{uv}(b_{uv}) & b_{uv} < |x| \leq m_{uv} \\ 0 & |x| \geq m_{uv} \end{cases} \quad \text{(equation 3)}$$

where $\theta_{uv}$ is an adjustment factor to guarantee that the integral of a probability density function is 1 in the entire interval; $b_{uv}$ represents a boundary between the generalized Gaussian distribution and the uniform distribution; $m_{uv}$ represents an available maximum value of x after quantization, and $f_{uv}(x)$ represents the generalized Gaussian distribution function, with the expression being equation 1:

$$f_{uv}(x) = \frac{\eta_{uv}\alpha_{uv}(\eta_{uv})}{2\sigma_{uv}\Gamma(1/\eta_{uv})}\exp\left\{-\left[\alpha_{uv}(\eta_{uv})\frac{|x|}{\sigma_{uv}}\right]^{\eta_{uv}}\right\} \quad \text{(equation 1)}$$

wherein:

$$\alpha_{uv}(\eta_{uv}) = \sqrt{\frac{\Gamma(3/\eta_{uv})}{\Gamma(1/\eta_{uv})}} \quad \text{(equation 2)}$$

in the expression, $f_{uv}(x)$ represents a probability density distribution (where u and v are coordinates of a position in the prediction block) of each position in the prediction block, $\sigma_{uv}$ denotes a standard deviation at the position, $\eta_{uv}$ controls a shape of the probability density function (predicted using the expression $$\eta_{uv} = 0.2718 \Big/ \left(0.7697 - \frac{E^2\{|x|\}}{E\{x^2\}}\right) - 0.1247,$$

and $\Gamma(\cdot)$ represents a gamma function.

2. The intra code-rate predicting method according to claim 1, wherein in the step 11) of making statistics on the prediction blocks of different sizes, the different sizes range from 4×4~64×64.

3. The intra code-rate predicting method according to claim 1, wherein the step 2) of predicting the number of coding bits of each prediction mode based on the combined model specifically comprises steps of:

21) first, computing a probability of the quantization result to be a certain value based on the probability density function; a computation expression for the generalized Gaussian distribution in the model being provided in equation 4:

$$P\{\widehat{C_{uv}} = \hat{x}\} = \begin{cases} 2 \cdot \int_0^{(1-f) \cdot Q_{step}} f'_{uv}(x)dx & \hat{x} = 0 \\ \int_{(|\hat{x}|-f) \cdot Q_{step}}^{(|\hat{x}|+1-f) \cdot Q_{step}} f'_{uv}(x)dx & \hat{x} \neq 0 \end{cases} =$$

$$\begin{cases} 2(1-f) \cdot Q_{step} \cdot f'_{uv}(x^*) \hat{x} = 0 \\ Q_{step} \cdot f'_{uv}(x^*) \hat{x} \neq 0 \end{cases} ;$$

(equation 4)

where f represents a quantization offset, $Q_{step}$ represents a quantization step size; if $\hat{x} \neq 0$, $x^* = |\hat{x}| \cdot Q_{step}$ is taken as an approximate result of the computation; if $\hat{x}=0$, the probability is not computed, and if the quantization result being 0 the number of coding bits is neglected; and a computation expression for the uniform distribution in the model being represented in equation 5:

$$P\{\widehat{C_{uv}} = \hat{x}\} = Q_{step} f_{uv}'(b_{uv})$$ (equation 5)

22) after obtaining the probability of the quantization result to be a certain value, predicting a number of coding bits $r_{uv}$ through equation 6:

$$r_{uv} = \begin{cases} 0 & \hat{x} = 0 \\ -\log_2\{\widehat{C_{uv}} = \hat{x}\} & \hat{x} \neq 0 \end{cases} ;$$ (equation 6)

and 23) obtaining a number of coding bits $r_B$ for each prediction block through equation 7:

$$r_B = \Sigma_u \Sigma_v r_{uv}$$ (equation 7);

where $Q_{step}$ represents the quantization step size; $f_{uv}'(b_{uv})$ represents the combined model; and $b_{uv}$ represents a boundary between the generalized Gaussian distribution and the uniform distribution.

4. The intra code-rate predicting method according to claim 1, wherein the simple entropy coding in step 3) including binarizing an entire entropy coding process and using a binarized number of bits as an entropy coding result.

* * * * *